US 8,492,950 B2

(12) United States Patent
Vallejo (10) Patent No.: US 8,492,950 B2
(45) Date of Patent: Jul. 23, 2013

(54) ROTOR ASSEMBLY FOR TRACTION MOTOR

(75) Inventor: Carlos A. Vallejo, Erie, PA (US)

(73) Assignee: General Electric Company, Schenectady, NY (US)

(*) Notice: Subject to any disclaimer, the term of this patent is extended or adjusted under 35 U.S.C. 154(b) by 534 days.

(21) Appl. No.: 12/760,616

(22) Filed: Apr. 15, 2010

(65) Prior Publication Data

US 2011/0254400 A1   Oct. 20, 2011

(51) Int. Cl.
*H02K 17/00* (2006.01)
*H02K 17/16* (2006.01)
*H02K 1/22* (2006.01)

(52) U.S. Cl.
USPC ......... 310/211; 310/197; 310/201; 310/261.1

(58) Field of Classification Search
USPC ............... 310/211, 216.113, 216.114, 197, 310/261.1
See application file for complete search history.

(56) References Cited

U.S. PATENT DOCUMENTS

| | | |
|---|---|---|
| 5,070,959 A | 12/1991 | Grabowski |
| 5,306,972 A | 4/1994 | Hokanson et al. |
| 5,444,319 A | 8/1995 | Nakamura et al. |
| 6,159,305 A | 12/2000 | Kliman et al. |
| 6,345,433 B1 | 2/2002 | Kliman et al. |
| 2006/0273683 A1 | 12/2006 | Caprio |

FOREIGN PATENT DOCUMENTS

| | | | |
|---|---|---|---|
| JP | 58207849 A | | 12/1983 |
| JP | 61094545 A | * | 5/1986 |
| JP | 10117468 A | | 5/1998 |
| JP | 2004304930 A | * | 10/2004 |

OTHER PUBLICATIONS

Machine Translation JP2004304930 (2004).*
PCT/US2010/058185 International Search Report and Written Opinion issued on Apr. 6, 2011.
PCT/US2010/058185 Written Opinion issued on Apr. 6, 2011.

* cited by examiner

*Primary Examiner* — Tran Nguyen
*Assistant Examiner* — Jose Gonzalez Quinones
(74) *Attorney, Agent, or Firm* — GE Global Patent Operation; John A. Kramer (57) ABSTRACT

In one embodiment, a rotor for an induction motor comprises a punching assembly, a plurality of conductive bars, and an end-ring. The plurality of conductive bars may be substantially parallel to an axis of the rotor and connected to the punching assembly at a periphery of the punching assembly. Each conductive bar includes an end connected to the end-ring. The end-ring comprises a punching side having a surface facing the punching assembly and a housing side having a surface opposite the punching surface. The end-ring may be thicker on the punching side than the housing side. In this manner, the peak end ring stresses may be reduced at higher speeds and the mean time between failures of the rotor may be increased. Alternatively, the threshold speed may be increased and the top-speed of the off-highway vehicle may be increased for a given expected mean time between failures of the rotor.

20 Claims, 4 Drawing Sheets

ROTOR ASSEMBLY FOR TRACTION MOTOR

FIELD

Certain embodiments of the subject matter disclosed herein relate to a traction motor for a vehicle, such as an off-highway vehicle.

BACKGROUND

Off-highway vehicles (OHVs), such as railway locomotives, mining trucks, and excavators, may be utilized to move a payload from one location to a different location. It may be desirable to increase the top speed of the off-highway vehicle to increase the productivity of the vehicle as measured by payload moved per unit time. One embodiment of an off-highway vehicle includes a diesel-electric power source coupled to a traction motor coupled to a wheel of the off-highway vehicle. The traction motor applies torque to the wheel so the vehicle speed may be increased as the speed of the traction motor is increased. In one embodiment of a traction motor, the traction motor is an alternating current (AC) induction motor including a stator and a rotor. The stator includes field windings that set up a rotating magnetic field around the rotor, causing the rotor to rotate around an axis. The rotor includes a shaft along the axis, a plurality of conductive bars substantially parallel to the axis, and a pair of end rings for connecting the plurality of conductive bars at each end of the rotor.

During operation of the traction motor, the end rings of the rotor are subjected to a variety of stresses, with some of the stresses increasing as the rotational speed of the rotor increases. Over time, the stresses may fatigue the end rings of the rotor and the rotor may fail, causing down-time and lost productivity for the vehicle. The fatigue may be reduced and the mean time between failures of the rotor may be increased by reducing the peak stress of the end ring, such as by operating the traction motor at a speed below a threshold speed, for example. However, reducing the operating speed leads to still other disadvantages, especially with regard to OHVs where increased speeds are increasingly being demanded.

BRIEF DESCRIPTION OF THE INVENTION

Accordingly, to address the above issues, various embodiments of a rotor of an induction motor are described herein. For example, in one embodiment, a rotor for an induction motor may comprise a punching assembly, a plurality of conductive bars, and an end-ring. The plurality of conductive bars may be substantially parallel to an axis of the rotor and connected to the punching assembly at a periphery of the punching assembly. Each conductive bar includes an end connected to the end-ring. The end-ring comprises a punching side having a punching surface facing the punching assembly and a housing side having a housing surface opposite the punching surface. The end-ring may be thicker on the punching side than the housing side. In this manner, the peak end ring stresses may be reduced at higher speeds and the mean time between failures of the rotor may be increased. Alternatively, the threshold speed may be increased and the top speed of the off-highway vehicle may be increased for a given expected mean time between failures of the rotor.

This brief description is provided to introduce a selection of concepts in a simplified form that are further described herein. This brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure. Also, the inventor herein has recognized any identified issues and corresponding solutions.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
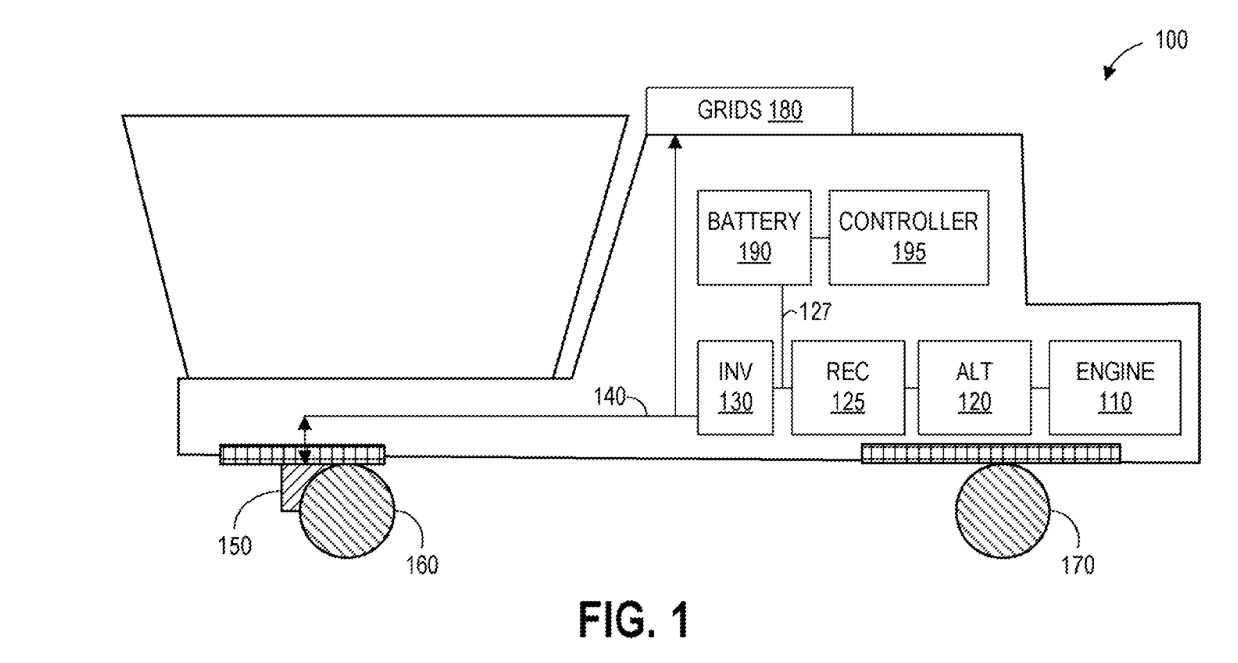
FIG. 1 shows an example embodiment of an off-highway vehicle comprising a traction motor.
Figure 2:
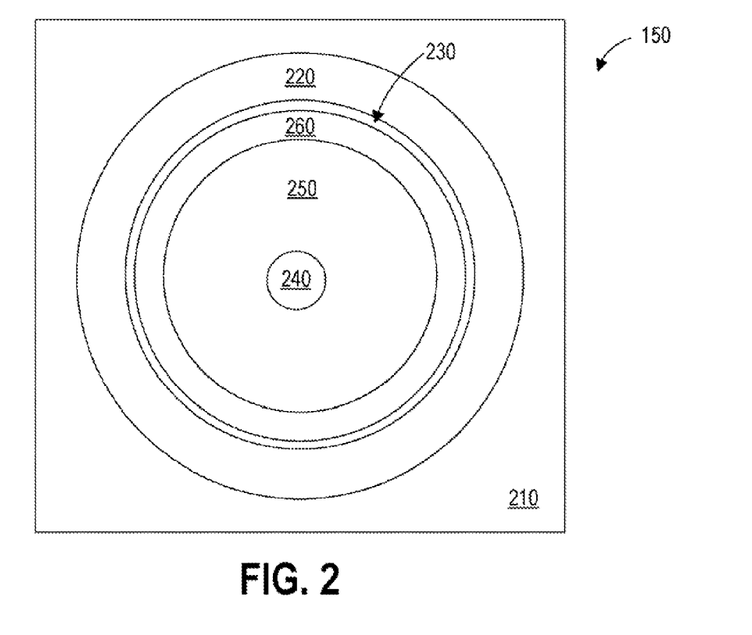
FIG. 2 shows an example embodiment of a traction motor comprising a stator and a rotor.
Figure 3:
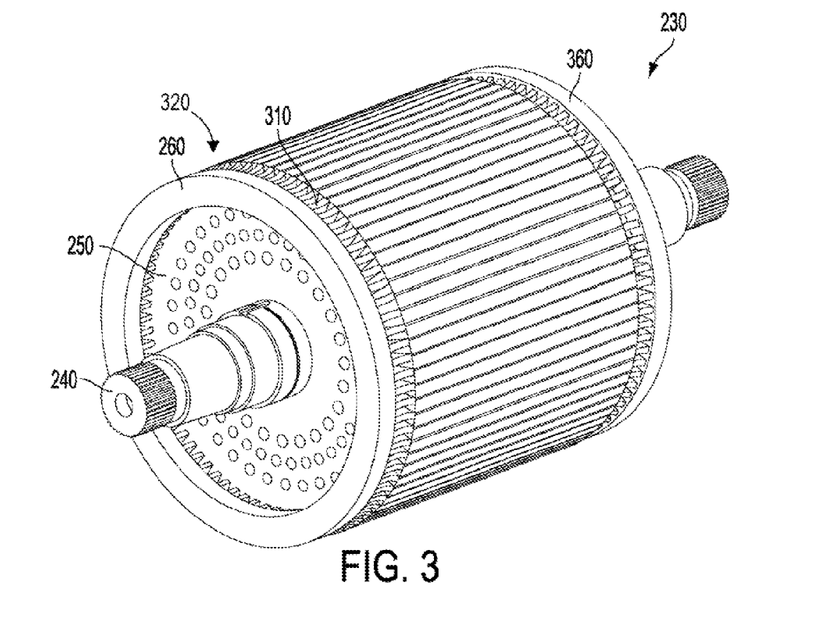
FIG. 3 shows an example embodiment of a rotor comprising an end-ring.
Figure 4:
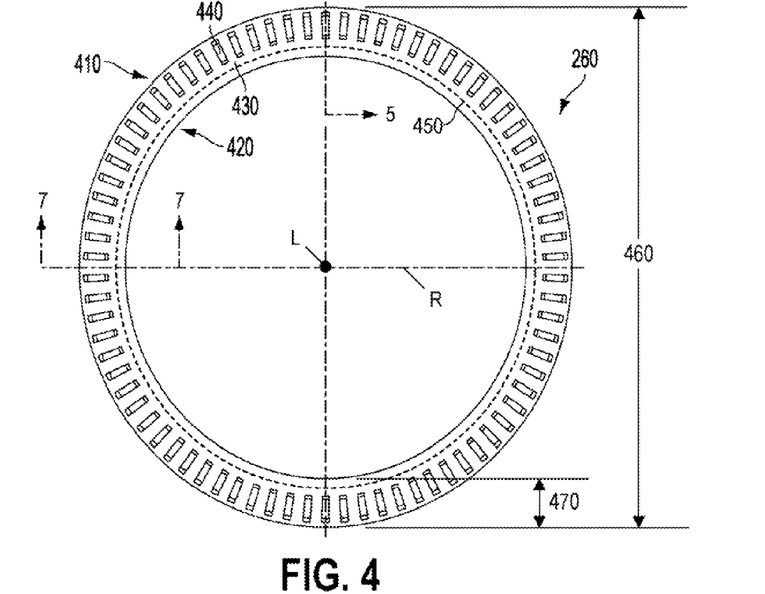
FIGS. 4-5 show different views of an example embodiment of the end-ring of FIG. 3.
Figure 5:
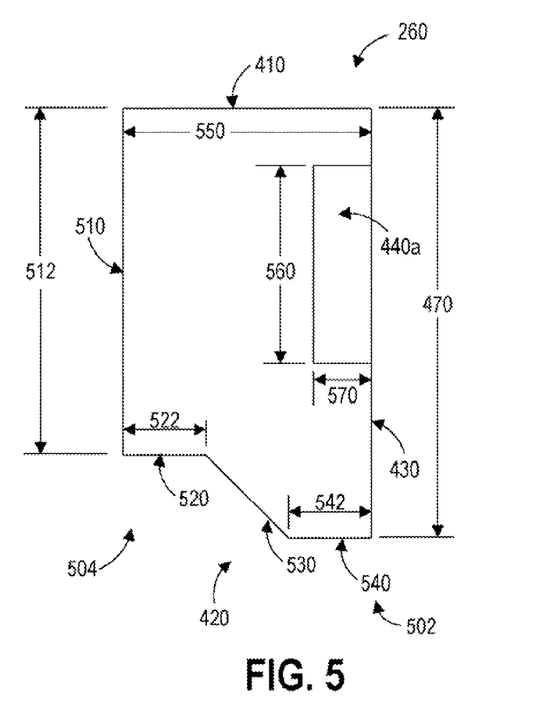
Figure 6:
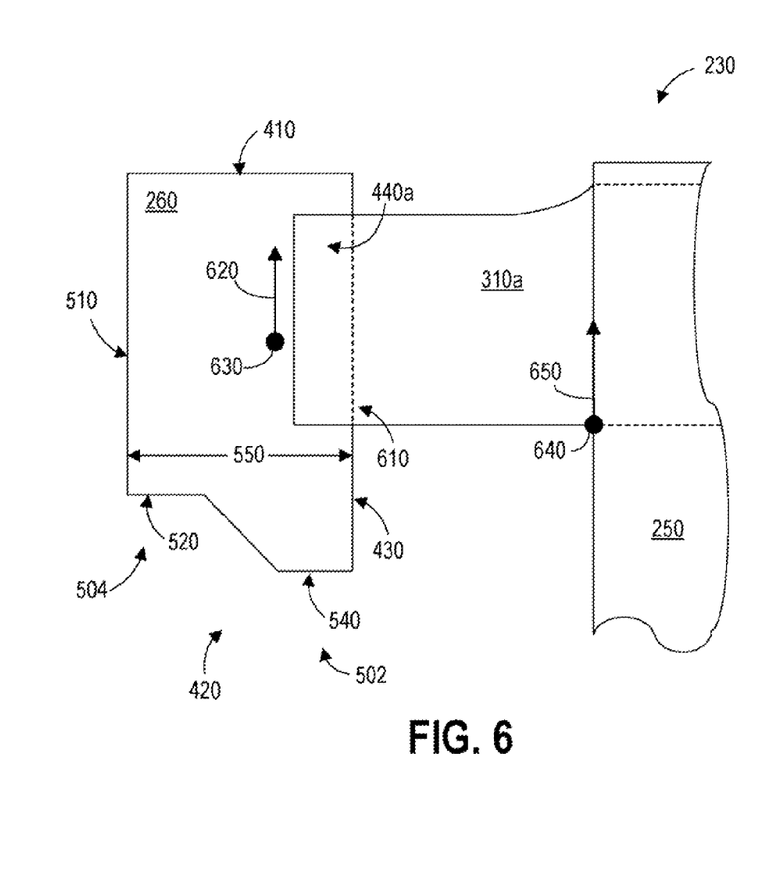
FIG. 6 shows an example of forces on an assembled rotor.
Figure 7:
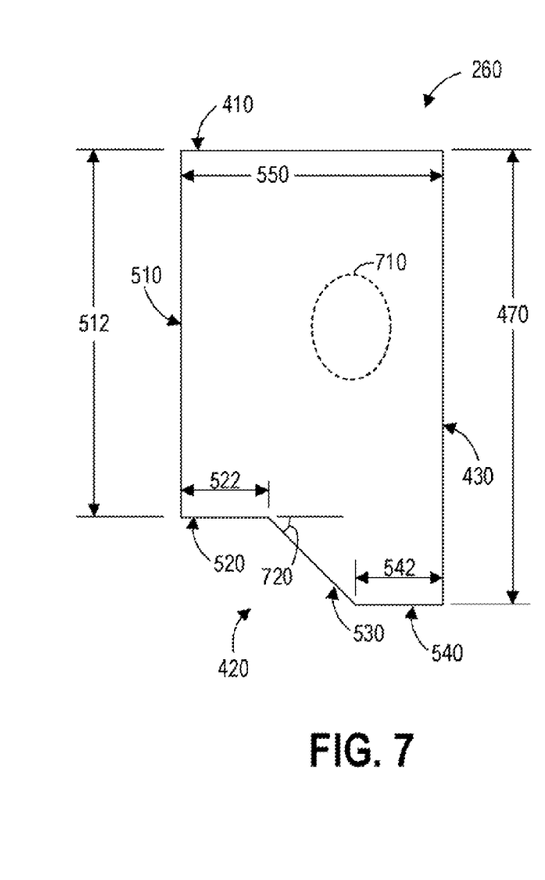
FIG. 7 shows a cross-section of an example embodiment of the end-ring of FIG. 3.

Productivity of off-highway vehicles may be increased when the top speed of the vehicle can be increased. FIG. 1 shows an example embodiment of an off-highway vehicle, specifically, FIG. 1 shows a mining truck. The mining truck includes a diesel-electric power source coupled to a traction motor coupled to a wheel of the mining truck. The traction motor provides torque to the wheel, so the top speed of the vehicle may be determined by a threshold speed of the traction motor. An example embodiment of a traction motor is illustrated in FIG. 2. The traction motor may be an alternating current (AC) induction motor including a stator and a rotor. FIG. 3 shows an example embodiment of a rotor comprising an end-ring. During operation of the traction motor, the end-ring of the rotor is subjected to a variety of stresses that may fatigue the end-ring. The shape of the end-ring may reduce stresses of the end-ring for a given speed of the traction motor. FIGS. 4-5 and 7 show different views of an example embodiment of the end-ring of FIG. 3. FIG. 6 shows an example of forces of an assembled rotor. By balancing the forces of the rotor through a specific cross-sectional shape of the end-ring, the stresses on the rotor may be reduced and the mean time between failures of the traction motor may be increased and/or the threshold speed of the traction motor and the top speed of the vehicle may be increased.

FIG. 1 is a block diagram of an example vehicle, herein depicted as mining truck 100. In one example, mining truck 100 may be a diesel electric vehicle including a diesel engine 110 as the primary power source. However, in alternate embodiments, alternate engine configurations may be employed, such as a gasoline, biodiesel, or natural gas engine, for example. Engine 110 may be started with an engine starting system. In one example, a generator start may be performed wherein the electrical energy produced by a generator or alternator 120 may be used to start engine 110. Alternatively, the engine starting system may comprise a motor, such as an electric starter motor, or a compressed air motor, for example. It will also be appreciated that the engine may be started using energy in a battery system, or other appropriate energy sources.

Engine 110 generates a torque that is transmitted to an alternator 120 ("ALT") along a drive shaft (not shown). The generated torque is used by alternator 120 to generate electricity for subsequent propagation of the vehicle. Engine 110 may be run at a constant speed, thereby generating a constant horsepower (hp) output, or at variable speed generating variable horsepower output, based on operational demand. Alternator 120 may be connected in series to one or more rectifiers 125 ("REC") that convert the alternator's electrical output to DC electrical power. The DC power is transmitted through DC bus 127 to one or more inverters that may be configured to invert the electrical power from the electrical bus prior to supplying electrical power to the downstream component. In one embodiment of mining truck 100, a single inverter 130 ("INV") may supply AC electrical power to a plurality of components. In an alternate embodiment, each of a plurality of distinct inverters may supply electrical power to a distinct component.

A traction motor 150, mounted to wheel 160, may receive electrical power from inverter 130 through the AC bus 140 to provide traction power to propel the vehicle. As described herein, traction motor 150 may be an AC induction motor. Accordingly, an inverter paired with the traction motor may convert a DC input to an appropriate AC input, such as a three-phase AC input, for subsequent use by the traction motor. One example vehicle configuration includes one inverter and one traction motor pair per driven wheel 160. In some embodiments, one or more wheels may be non-driven, such as wheel 170, for example. Traction motor 150 may also be configured to act as a generator providing dynamic braking to brake mining truck 100. In particular, during dynamic braking, the traction motor may provide torque in a direction that is opposite from the rolling direction, thereby generating electricity that is dissipated as heat by a grid of resistors 180 connected to the electrical bus. In one example, the grid includes stacks of resistive elements connected in series directly to the electrical bus. The stacks of resistive elements may be positioned on a vehicle housing of mining truck 100 in order to facilitate air cooling and heat dissipation from the grid.

An on-board electrical energy storage device, represented by battery 190 in this example, may also be linked to DC bus 127. A DC-DC converter (not shown) may be configured between DC bus 127 and battery 190 to allow the high voltage of the DC bus (for example in the range of 1000V) to be stepped down appropriately for use by the battery (for example in the range of 12-75V). In the case of a hybrid vehicle, the on-board electrical energy storage device may be in the form of high voltage batteries, such that the placement of an intermediate DC-DC converter may not be necessitated. The battery may be charged by running engine 110. The electrical energy stored in the battery may be used during a stand-by mode of engine operation, or when the engine is shut down, to operate various electronic components such as lights, on-board monitoring systems, microprocessors, processor displays, climate controls, and the like. Battery 190 may also be used to provide an initial charge to start-up engine 110 from a shut-down condition. In alternate embodiments, electrical energy storage device 190 may be a super-capacitor, for example.

On-board controller 195 may control the engine 110, in response to operator input, by sending a command to various engine control hardware components such as invertors 130, alternator 120, relays, fuel injectors, fuel pumps (not shown), etc. On-board controller 195 may monitor the speed of mining truck 100 and/or traction motor 150 and regulate the speed of traction motor 150. For example, on-board controller 195 may increase the voltage and/or frequency from inverter 130 to increase the torque supplied from traction motor 150. In another example, on-board controller 195 may apply dynamic braking if the speed of traction motor 150 exceeds a speed threshold.

FIG. 2 shows an example embodiment of a traction motor 150 comprising housing 210, stator 220, and rotor 230. Housing 210 includes a mounting surface for attaching traction motor 150 to a vehicle, such as mining truck 100. Housing 210 may also include cooling fins for cooling traction motor 150. Stator 220 includes one or more pairs of wound poles that may be connected to a source of AC power, such as AC bus 140. The poles are distributed in stator 220 to induce a rotating magnetic field around rotor 230 when AC power is applied. Stator 220 is coupled to housing 210 such that stator 220 is stationary with respect to rotor 230. Stator 220 includes a cavity where rotor 230 may be inserted. Rotor 230 comprises shaft 240, punching assembly 250, end-ring 260, and a plurality of conductive bars (not shown in FIG. 2) arranged substantially parallel to the axis of rotor 230. For example, skewing the plurality of conductive bars at a slight angle from the axis may reduce noise and harmonics. End-ring 260 mechanically and electrically connects to one end of each of the plurality of conductive bars. A second end-ring (not shown in FIG. 2) mechanically and electrically connects to the other end of each of the plurality of conductive bars. Punching assembly 250 mechanically couples the plurality of conductive bars to shaft 240. When AC power is supplied to traction motor 150, a rotating magnetic field is generated by stator 220, which induces eddy currents in the plurality of conductive bars. The eddy currents interact with the rotating magnetic field according to Lorentz force and cause the rotor to rotate about an axis of the rotor. Shaft 240 may be coupled to wheel 160 in a driving relationship through suitable gearing. In this manner, traction motor 150 may be used to provide torque to wheel 160 and move vehicle 100.

FIG. 3 shows another view of the example embodiment of rotor 230. Rotor 230 comprises a plurality of conductive bars 310, end-rings 260 and 360, punching assembly 250, and shaft 240. Punching assembly 250 may comprise a plurality of through-holes extending axially along rotor 230. The plurality of through-holes may be configured to enable air to flow through and cool rotor 230. Punching assembly 250 may comprise a stack of laminated punchings. In one embodiment, each punching may be mechanically punched or cut from a sheet of high silicon steel or a magnetic alloy. Each punching may be varnished or laminated to electrically insulate the punching from adjacent punchings and to reduce losses from eddy currents in punching assembly 250. In an alternate embodiment, punching assembly 250 may comprise a solid core. Punching assembly 250 may be attached to shaft 240 by an interference fit. For example, punching assembly 250 may be heated and then positioned on a cool shaft 240 so that an interference fit is formed when the assembly cools.

The plurality of conductive bars 310 may be distributed around a periphery of punching assembly 250. The plurality of conductive bars 310 may extend beyond an end of punching assembly 250 such that a space 320 is present between the end of punching assembly 250 and end-ring 260. (Additionally or alternatively, the plurality of conductive bars 310 may extend beyond an other or second end of punching assembly 250 such that a space, similar to space 320, is present between the other end of punching assembly 250 and other end-ring 360.) In one embodiment, the plurality of conductive bars 310 may be equally distributed around a periphery of punching assembly 250. Non-limiting examples of the cross-section of each conductive bar are circular, square, and rectangular. The plurality of conductive bars 310 may be supported by punching assembly 250. In one embodiment, punching assembly 250 may fully or partially cover the plurality of conductive bars 310 around the periphery of punching assembly. In an alternate embodiment, one or more sides of the plurality of conductive bars 310 may be visible when assembled with punching assembly 250. Each conductive bar includes a first end that may extend beyond an end of punching assembly 250 when rotor 230 is assembled. The first end of each conductive bar may be mechanically and electrically connected to end-ring 260.

In one embodiment, the plurality of conductive bars 310 and end-rings 260 and 360 may comprise copper. In another embodiment, end-rings 260 and 360 may be a forged alloy including copper, molybdenum, and chromium. Slip and rotor losses may be reduced if the plurality of conductive bars 310 and end-rings 260 and 360 comprise copper. End-rings 260 and 360 may be brazed to the plurality of conductive bars 310 using a conductive alloy including silver, for example.

Punching assembly 250 may be pre-stressed to prevent loosening from shaft 240 when rotor 230 is rotating at high speed. Loosening at high speed may occur when centrifugal forces stretch punching assembly 250 radially away from shaft 240 according to Poisson's ratio for the punching material. By pre-stressing punching assembly 250, the speed of rotor 230 may be increased before loosening occurs. In one embodiment, punching assembly 250 may be pre-stressed by heating rotor 230 during assembly when a coefficient of thermal expansion of the plurality of conductive bars 310 and end rings 260 and 360 are greater than a coefficient of thermal expansion of punching assembly 250. When rotor 230 cools, conductive bars 310 and end rings 260 and 360 may shrink more than punching assembly 250, compressing punching assembly 250 and holding it firmly to shaft 240. However, pre-stressing punching assembly 250 may also generate a force that stresses end-rings 260 and 360 at the connection to the plurality of conductive bars 310.

FIGS. 4-5 and 7 show different views of an example embodiment of an end-ring, such as end-ring 260 or 360. FIG. 4 shows a front view of end-ring 260 as referenced from the surface of end-ring 260 that faces punching assembly 250. FIGS. 5 and 7 show different cross-sectional views of end-ring 260. (The various views are applicable to both end-rings 260, 360.)

Returning to FIG. 4, end-ring 260 includes outer surface 410, inner surface 420, punching surface 430, and a housing surface (not shown in FIG. 4, but see, e.g., 510 in FIG. 5) opposite of punching surface 430. Outer surface 410 forms the outer circumference of end-ring 260 and adjoins punching surface 430 and the housing surface. The housing surface faces housing 210 when assembled in traction motor 150. The housing surface adjoins outer surface 410 and inner surface 420. Inner surface 420 forms the inner circumference of end-ring 260 and adjoins the housing surface and punching surface 430. In one embodiment, inner surface 420 may include one or more faces so that end-ring 260 is thinner (e.g., radially thinner) near the housing surface than near punching surface 430. For example, two faces of inner surface 420 may intersect at hidden line 450. In one embodiment, an end-ring diameter 460 may be between eight and thirteen times greater than punching surface height 470.

Punching surface 430 faces punching assembly 250 when assembled in traction motor 150. In an embodiment, punching surface 430 includes a plurality of pockets 440. In one embodiment, each pocket is equally spaced around the circumference of end-ring 260. An end of a conductive bar may be inserted into a pocket to facilitate the joining of the plurality of conductive bars 310 to end-rings 260 and 360. A joint is formed when a conductive bar is brazed to an end-ring or otherwise connected to an end-ring by a metal joining process. In an alternate embodiment, the plurality of pockets may be omitted and the plurality of conductive bars may be brazed, soldered, welded, or otherwise metal-joined to the end-rings. The joints where the plurality of conductive bars 310 are attached to end-rings 260 and 360 may be under stress from pre-stressing punching assembly 250. The stress may be determined as a function of the assembly temperature, the brazing temperature, the coefficient of thermal expansion and Poisson's ratio for punching assembly 250, the plurality of conductive bars 310, end-rings 260 and 360, and shaft 240.

FIG. 5 illustrates a cross-sectional area of end-ring 260 at a pocket. End-ring 260 includes a punching side 502 facing punching assembly 250 when traction motor 150 is assembled. Punching side 502 includes punching surface 430. Punching side 502 may include a pocket 440a for receiving an end of a conductive bar. Housing side 504 includes housing surface 510 facing housing 210 when traction motor 150 is assembled. End-ring 260 may be thicker (e.g., radially thicker) on punching side 502 than on housing side 504. For example, punching surface height 470 may be between 1.1 and 1.3 times greater than a housing surface height 512. In one embodiment, inner surface 420 may have one or more faces, such as faces 520, 530, and 540. (One face is distinguished from another by each lying in a different, distinct plane.) Face 520 may have a width 522 such that housing side 504 is a substantially constant radial thickness (e.g., dimension 512) to between one fourth and one half of the way toward punching surface 430. Face 540 may have a width 542 such that punching side 502 is a substantially constant radial thickness (e.g., dimension 470 between pockets 440) to between one fourth and one half of the way toward housing surface 510. An end-ring axial width 550 may be less than punching surface height 470 and housing surface height 512. In one embodiment, end-ring width 550 may be between one half and two thirds punching surface height 470.

Each surface of end-ring 260 may adjoin an adjacent surface of end-ring 260 in various manners. In one non-limiting embodiment, a first surface may adjoin a second surface at a right angle. For example, outer surface 410 may adjoin punching surface 430 at a right angle. In an alternate non-limiting embodiment, a first surface may adjoin a second surface via an intermediary surface, such as a chamfer or a rounded corner, for example.

Pocket 440a may be shaped to receive an end of a conductive bar. In one embodiment, a pocket height 560 is less than one half of punching surface height 470 and a pocket depth 570 is less than one half of end-ring width 550.

FIG. 6 shows a partial view of rotor 230 after it has been assembled. The partial view shows the cross-section of end-ring 260 from FIG. 5 attached to conductive bar 310a and punching assembly 250. Conductive bar 310a extends through punching assembly 250 and a first end fits into pocket 440a of end-ring 260. FIG. 6 also shows an example of forces that may fatigue end-ring 260 during operation of traction motor 150. For example, the centrifugal forces of spinning rotor 230 may generate forces that can fatigue end-ring 260 and/or conductive bar 310a during operation of traction motor 150.

Joint 610 connects end-ring 260 to conducting bar 310a. During operation, rotor 230 may spin and centrifugal forces are generated by each of the components of the spinning rotor 230. The centrifugal force is proportional to the distance from the axis of rotor 230, the mass of the component, and the square of the angular velocity. The centrifugal force may stretch the components of rotor 230 according to Poisson's ratio. One or more of end-rings 260 and 360, the plurality of conductive bars 310, punching assembly 250, and shaft 240 may be constructed from different materials that have different Poisson's ratios. Each component of rotor 230 may stretch different amounts since each component has a different shape, a different centrifugal force, and a different Poisson's ratio. Thus, components of rotor 230 may flex as rotor 230 is rotated at different velocities during operation of traction motor 150 and the flexing may fatigue end-ring 260 and cause it to fail over time.

The stress may be reduced if the forces acting on components of rotor 230 can be more balanced over the duty cycle of traction motor 150. For example, a spinning rotor 230 may generate end-ring centrifugal force 620 and punching assembly centrifugal force 650 in a radial direction away from the rotor axis. End-ring centrifugal force 620 may act at end-ring cross-section centroid 630, for example. Punching assembly centrifugal force 650 may act at punching-conductive bar interface 640, for example. The centrifugal forces and the pre-stress forces create a moment about joint 610. Reducing the moment over the duty cycle of traction motor 150 may reduce the stress and fatigue of end-rings 260 and 360, for example. In addition, the top-speed of rotor 230 may be increased by reducing the moment at the top-speed of rotor 230. In this manner, the peak stress may be reduced at the top speed of rotor 230 and the mean time between failure of end-ring 260 may be increased.

In one embodiment, the moment about joint 610 may be decreased when end-ring 260 includes punching side 502 thicker (e.g., radially thicker) than housing side 504. For example, end-ring 260 may be between 1.1 and 1.3 times thicker near punching side 502 than near housing side 504. End-ring 260 may include a face 540 adjoining punching surface 430 and having substantially constant thickness (e.g., radial thickness) from punching surface 430 to between one fourth and one half the distance toward housing surface 510. End-ring 260 may include a face 520 adjoining housing surface 510 and having substantially constant thickness (e.g., radial thickness) from housing surface 510 to between one fourth and one half the distance toward punching surface 430. End-ring 260 includes an end-ring axial width 550 measured from punching surface 430 to housing surface 550 and end-ring width 550 may be between one half and two thirds the thickness of end-ring 260 near punching surface 430. In some embodiments, outer surface 410 may adjoin punching surface 430 and housing surface 550 at a right angle. In alternate embodiments, the intersection of outer surface 410 and punching surface 430 may be chamfered or rounded. In a similar manner, the intersection of outer surface 410 and housing surface 550 may be chamfered or rounded, for example.

In one embodiment, the moment about joint 610 may be decreased when end-ring 260 includes a cross-sectional area as illustrated in FIG. 7. FIG. 7 illustrates a cross-sectional area of end-ring 260 that does not intersect a pocket of plurality of pockets 440. The cross-sectional area may include punching surface 430, housing surface 510, outer surface 410, and inner surface 420. The moment about joint 610 may be decreased when the cross-section of end-ring 260 includes a centroid that is closer to punching surface 430 than housing surface 510. For example, the centroid may be in region 710. When end-ring 260 is a homogeneous material, the centroid of the cross-section may also be the center of mass of the cross-section. In one embodiment, inner surface 420 may include a first face 520 substantially parallel to outer surface 410 and a second face 540 substantially parallel to outer surface 410. A distance 470 from outer surface 410 and second face 540 may be between 1.1 and 1.3 times greater than a distance 512 from outer surface 410 and first face 520. A width 522 of first face 520 may be between 0.8 and 1.2 times a width 542 of second face 540. First face 520 may be joined to second face 540 by a third face 530 at an angle 720 of between 35 degrees and 55 degrees from first face 520. An end-ring width 550 may be between one half and two thirds punching surface height 470.

In this manner, stress on end rings 260 and 360 may be reduced during operation of traction motor 150. The reduction of stress may reduce fatigue of end rings 260 and 360 and enable a longer mean time to fail for traction motor 150 and/or a higher top speed of traction motor 150.

Dimensions of the end-rings 260 and 360 may be defined in terms of the axis and radius of the end-ring. Axial directions are parallel to a longitudinal axis "L" of the end-ring (see FIG. 4), for example, direction 550 in FIGS. 5-7. Radial directions are perpendicular to the longitudinal axis of the end-ring, corresponding to a radius "R" (see FIG. 4) of the circular shape of the end-ring. For example, radial directions include 512 and 470 in FIGS. 5 and 7.

In an embodiment, an end-ring for an induction motor rotor comprises a solid annular (ring-shaped) body. The annular body has a longitudinal axis L, which is perpendicular to the plane defined by the circular shape of the body. The solid annular body defines an annular housing surface perpendicular to the axis L. From the housing surface, the body extends axially perpendicularly rearwards for a first axial distance, with the body having a first constant radial width along this first distance. ("Rearwards" meaning a direction perpendicular to the housing surface and parallel to the axis L.) Extending for a second axial distance, starting at the rearwards terminus of the first axial distance, the width of the body linearly increases in a radially inwards direction. That is, the body (i) has a constant outer radius; (ii) for the first axial distance, the body has a constant inner radius; and (iii) along the second axial distance, the inner radius of the body decreases linearly, having a largest inner radius at the juncture of the first axial distance and the second axial distance, and a smallest inner radius at the rearwards terminus of the second axial distance. Starting at the rearwards terminus of the second axial distance, the body extends axially perpendicularly rearwards for a third axial distance, with the body having a second constant radial width along this third distance. The second constant radial width is defined as between the constant outer radius and the smallest inner radius. The body terminates at an annular punching surface perpendicular to the axis L and generally parallel to the housing surface.

Although the term "punching" assembly is used herein to describe certain embodiments of the invention, this term is not limited to assemblies formed of or otherwise comprising punchings (meaning articles manufactured by cutting or punching). Instead, unless otherwise recited in the claims through a more specific recitation of structure and/or composition, "punching assembly" refers to any assembly for mechanically coupling a plurality of conductive bars to a shaft, typically such that the conductive bars lie generally parallel to and radially offset from the shaft.

In an embodiment, "substantially" or "generally" parallel means parallel but for manufacturing tolerances. In another embodiment, "substantially" or "generally" parallel means an off-parallel skew up to and including 10 degrees When a distance or quantity is characterized herein as being "between" a first boundary and a second boundary, this means between and including the first and second boundaries, unless otherwise specified through the provision of language excluding the first and second boundaries. For example, when it is specified that a first distance may be between X and Y times greater than a second distance, where X<Y for example, this means: (Y)(second distance)≧first distance≧(X)(second distance)>(second distance).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to illustrate the parameters of the invention, they are by no means limiting and are exemplary embodiments, unless otherwise specified. Many other embodiments will be apparent to those of skill in the art upon reviewing the above description. Therefore, the scope of the invention should be determined with reference to the appended claims, along with the full scope of equivalents to which such claims are entitled. In the appended claims, any instances of the terms "including" and "in which" are used as the plain-English equivalents of the respective terms "comprising" and "wherein." Moreover, in the following claims, the terms "first," "second," "third," "upper," "lower," "bottom," "top," etc. are used merely as labels, and are not intended to impose numerical or positional requirements on their objects. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A rotor for an induction motor comprising:
a punching assembly;
a plurality of conductive bars substantially parallel to an axis of the rotor and connected to the punching assembly at a periphery of the punching assembly, each conductive bar having an end; and
an end-ring connected to the end of each conductive bar of the plurality of conductive bars, the end-ring comprising a punching side having a punching surface facing the punching assembly, a housing side having a housing surface opposite the punching surface, the end-ring being thicker on the punching side than the housing side, a width measuring from the punching surface to the housing surface having a smaller value than a thickness of the end-ring on the punching side.

2. A rotor for an induction motor comprising:
a punching assembly;
a plurality of conductive bars substantially parallel to an axis of the rotor and connected to the punching assembly at a periphery of the punching assembly, each conductive bar having an end; and
an end-ring connected to the end of each conductive bar of the plurality of conductive bars, the end-ring comprising a punching side having a punching surface facing the punching assembly, a housing side having a housing surface opposite the punching surface, the end-ring being thicker on the punching side than the housing side, wherein the end-ring is between 1.1 and 1.3 times thicker on the punching side than on the housing side.

3. A rotor for an induction motor comprising:
a punching assembly;
a plurality of conductive bars substantially parallel to an axis of the rotor and connected to the punching assembly at a periphery of the punching assembly, each conductive bar having an end; and
an end-ring connected to the end of each conductive bar of the plurality of conductive bars, the end-ring comprising a punching side having a punching surface facing the punching assembly, a housing side having a housing surface opposite the punching surface, the end-ring being thicker on the punching side than the housing side, wherein the punching side of the end-ring is a substantially constant thickness from the punching surface to between one fourth and one half a distance toward the housing surface.

4. A rotor for an induction motor comprising:
a punching assembly;
a plurality of conductive bars substantially parallel to an axis of the rotor and connected to the punching assembly at a periphery of the punching assembly, each conductive bar having an end; and
an end-ring connected to the end of each conductive bar of the plurality of conductive bars, the end-ring comprising a punching side having a punching surface facing the punching assembly, a housing side having a housing surface opposite the punching surface, the end-ring being thicker on the punching side than the housing side, wherein the housing side of the end-ring is a substantially constant thickness from the housing surface to between one fourth and one half a distance toward the punching surface.

5. A rotor for an induction motor comprising:
a punching assembly;
a plurality of conductive bars substantially parallel to an axis of the rotor and connected to the punching assembly at a periphery of the punching assembly, each conductive bar having an end; and
an end-ring connected to the end of each conductive bar of the plurality of conductive bars, the end-ring comprising a punching side having a punching surface facing the punching assembly, a housing side having a housing surface opposite the punching surface, the end-ring being thicker on the punching side than the housing side, wherein the end-ring includes a width measured from the punching surface to the housing surface and the width is between one half and two thirds a thickness of the end-ring on the punching side.

6. The rotor of claim 1, wherein the punching side of the end-ring includes a plurality of pockets.

7. The rotor of claim 6, wherein each pocket of the plurality of pockets includes a height of less than one half of the thickness of the punching side.

8. The rotor of claim 6, wherein each pocket of the plurality of pockets includes a depth less than one half of a width of the end-ring, the width of the end-ring measured from the punching surface to the housing surface.

9. A rotor for an induction motor comprising:
   a punching assembly;
   a plurality of conductive bars substantially parallel to an axis of the rotor and connected to the punching assembly at a periphery of the punching assembly, each conductive bar having an end; and
   an end-ring connected to the end of each conductive bar of the plurality of conductive bars, the end-ring comprising a punching side having a punching surface facing the punching assembly, a housing side having a housing surface opposite the punching surface, the end-ring being thicker on the punching side than the housing side, wherein a diameter of the end-ring is between eight and thirteen times greater than a thickness of the punching side.

10. The rotor of claim 1, wherein the end of each conductive bar extends beyond an end of the punching assembly before connecting to the end-ring.

11. The rotor of claim 1, wherein the end-ring comprises copper.

12. A rotor for an induction motor comprising:
   a punching assembly;
   a plurality of conductive bars substantially parallel to an axis of the rotor and connected to the punching assembly at a periphery of the punching assembly, each conductive bar having an end; and
   an end-ring connected to the end of each conductive bar of the plurality of conductive bars, the end-ring comprising copper and having a cross-section comprising:
      a punching surface facing the punching assembly;
      a housing surface opposite the punching surface;
      an outer surface adjoining the punching surface and the housing surface; and
      an inner surface opposite the outer surface, the inner surface including a first face adjoining the housing surface and substantially parallel to the outer surface, a second face adjoining the punching surface and substantially parallel to the outer surface, and a distance from the outer surface to the second face being between 1.1 and 1.3 times greater than a distance from the outer surface to the first face.

13. The rotor of claim 12, wherein a width of the first face of the inner surface of the end-ring is between 0.8 and 1.2 times a width of the second face of the inner surface of the end-ring.

14. The rotor of claim 12, wherein the first face of the inner surface of the end-ring is joined to the second face of the inner surface of the end-ring by a third face of the inner surface of the end-ring, the third face at an angle between 35 and 55 degrees from the first face.

15. The rotor of claim 12, wherein a width of the outer surface of the end-ring is between one half and two thirds the distance from the outer surface to the second face.

16. The rotor of claim 12, wherein a diameter of the end-ring is between eight and thirteen times greater than the distance from the outer surface to the second face.

17. A traction motor including a rotor, the rotor comprising:
   a punching assembly;
   a plurality of conductive bars substantially parallel to an axis of the rotor and connected to the punching assembly at a periphery of the punching assembly, each conductive bar having an end; and
   an end-ring connected to the end of each conductive bar of the plurality of conductive bars, the end-ring including a cross-section comprising:
      a punching surface, a housing surface opposite the punching surface, an outer surface adjoining the punching surface and the housing surface, an inner surface opposite the punching surface, a centroid that is closer to the punching surface than to the housing surface, a first face adjoining the housing surface and parallel within manufacturing tolerances to the outer surface, and a second face adjoining the punching surface and parallel within manufacturing tolerances to the outer surface.

18. A traction motor including a rotor, the rotor comprising:
   a punching assembly;
   a plurality of conductive bars substantially parallel to an axis of the rotor and connected to the punching assembly at a periphery of the punching assembly, each conductive bar having an end; and
   an end-ring connected to the end of each conductive bar of the plurality of conductive bars, the end-ring including a cross-section comprising:
      a punching surface, a housing surface opposite the punching surface, an outer surface adjoining the punching surface and the housing surface, an inner surface opposite the punching surface, and a centroid that is closer to the punching surface than to the housing surface, wherein a width of the outer surface of the end-ring cross-section of the rotor is between one half and two thirds a width of the punching surface of the end-ring cross-section.

19. A traction motor including a rotor, the rotor comprising:
   a punching assembly;
   a plurality of conductive bars substantially parallel to an axis of the rotor and connected to the punching assembly at a periphery of the punching assembly, each conductive bar having an end; and
   an end-ring connected to the end of each conductive bar of the plurality of conductive bars, the end-ring including a cross-section comprising:
      a punching surface, a housing surface opposite the punching surface, an outer surface adjoining the punching surface and the housing surface, an inner surface opposite the punching surface, and a centroid that is closer to the punching surface than to the housing surface, wherein a diameter of the end-ring of the rotor is between eight and thirteen times greater than a width of the punching surface.

20. The motor of claim 17, wherein the end of each conductive bar of the rotor extends beyond an end of the punching assembly before connecting to the end-ring.

* * * * *

UNITED STATES PATENT AND TRADEMARK OFFICE
CERTIFICATE OF CORRECTION

PATENT NO.       : 8,492,950 B2  
APPLICATION NO.  : 12/760616  
DATED            : July 23, 2013  
INVENTOR(S)      : Vallejo Page 1 of 1

It is certified that error appears in the above-identified patent and that said Letters Patent is hereby corrected as shown below:

In the Specification

In Column 7, Line 41, delete "housing surface 550" and insert -- housing surface 510 --, therefor.

In Column 7, Line 45, delete "housing surface 550" and insert -- housing surface 510 --, therefor.

In Column 7, Line 49, delete "housing surface 550" and insert -- housing surface 510 --, therefor.

Signed and Sealed this  
Third Day of June, 2014

Michelle K. Lee  
*Deputy Director of the United States Patent and Trademark Office*